United States Patent [19]

Reven

[11] 4,188,229
[45] Feb. 12, 1980

[54] HIGH TEMPERATURE REFRACTORY CAULKING COMPOSITION

[75] Inventor: Frederick V. Reven, Homewood, Ill.

[73] Assignee: Nalco Chemical Company, Oak Brook, Ill.

[21] Appl. No.: 963,665

[22] Filed: Nov. 24, 1978

[51] Int. Cl.$^2$ ............................................. C04B 35/14
[52] U.S. Cl. ........................................ 106/68; 106/69
[58] Field of Search ................................... 106/68, 69

[56] References Cited

U.S. PATENT DOCUMENTS

| | | | |
|---|---|---|---|
| 1,969,751 | 8/1934 | Heuer | 106/69 |
| 2,660,536 | 11/1953 | West | 106/68 |
| 2,802,749 | 8/1957 | West | 106/69 |
| 2,901,367 | 8/1959 | Kraner | 106/69 |
| 3,359,124 | 12/1967 | Henry | 106/68 |
| 3,814,613 | 6/1974 | Hubble | 106/68 |

*Primary Examiner*—Brian E. Hearn
*Attorney, Agent, or Firm*—John G. Premo; Robert A. Miller

[57] ABSTRACT

A high temperature refractory caulking composition useful for sealing coke oven ascension pipes, Sinter furnaces and the like, comprising:

| Ingredients | % by Weight |
|---|---|
| Alpha cristobalite | 10–30 |
| Alpha-quartz | 10–50 |
| Glassy polyphosphate having a deformation temperature of at least 500° C. | 10–50 |
| Bentonite clay | 1–10 |
| Water | An amount sufficient to form the above ingredients into a workable plastic mass. |

Optionally, amounts of Fluorspar and phosphoric acid may be added to the above.

6 Claims, No Drawings

HIGH TEMPERATURE REFRACTORY CAULKING COMPOSITION

INTRODUCTION

Coke ovens used to produce coke from coal are constructed so that the noxious vapors and gases produced in the coking operations are removed from the furnace by means of a standpipe known as an ascension pipe which delivers these vapors from the top of the furnace into a collecting main. The joint where the ascension pipe enters the top of the furnace is not gas-tight. It is customary to seal this joint with a clay mortar such as Bentonite or asbestos which is slurried or trowelled into the joint in an effort to make it gas-tight. Without this use of clay to seal these joints, the noxious vapors would escape into the atmosphere and create serious pollution problems.

Until the present invention, clay or asbestos seals of the type described are only capable of preventing gas escape on a single campaign of the furnace. Since the temperature of the ascension pipe where it joins the furnace is greater than 500° C., the clay seals tend to crack due to thermal expansion and contraction. This means that the joint must be re-sealed for every new coke production campaign or cycle.

If it were possible to produce a relatively inexpensive caulk for sealing ascension pipe joints which would last for several coke production campaigns, an advance in the art would be afforded. For a more detailed description of the ascension pipe, its construction and use in a coke oven, see Chapter 4, *The Making, Shaping and Treating of Steel*, 9th Edition, United States Steel (1971).

THE INVENTION

In accordance with the invention, it has been found that an improved refractory caulking composition useful in sealing the joints of ascension pipes used in coke ovens is afforded by the following composition:

| Composition 1 | |
|---|---|
| Ingredients | % by Weight |
| Alpha cristobalite | 10-30 |
| Alpha-quartz | 10-50 |
| Glassy polyphosphate having a deformation temperature of at least 500° C. | 10-50 |
| Bentonite clay | 1-10 |
| Water | An amount sufficient to form the above ingredients into a workable plastic mass. |

While any glassy phosphate having a melting point of about 500° C. may be used, I prefer to use sodium hexametaphosphate.

These formulas may be improved by combining therewith Fluorspar and phosphoric acid. Thus, a typical preferred composition would be the following:

| Composition 2 | |
|---|---|
| Ingredients | % by Weight |
| Fluorspar | 5-15 |
| 75% $H_3PO_4$ | 10-30 |
| Alpha cristobalite | 10-30 |
| Alpha-quartz | 10-50 |
| Glassy polyphosphate having a deformation temperature of at least 500° C. | 10-50 |
| Bentonite clay | 1-10 |
| Water | An amount sufficient to form the above ingredients into a workable mass. |

A specific composition is:

| Composition 3 | |
|---|---|
| Ingredients | % by Weight |
| Alpha cristobalite (100 mesh) | 24.6 |
| Alpha-quartz (100 mesh) | 34.1 |
| Sodium hexametaphosphate | 24.6 |
| Bentonite clay (325 mesh) | 2.5 |
| Water | 14.2 |

A preferred specific composition of the invention is set forth below as Composition 4.

| Composition 4 | |
|---|---|
| Ingredients | % by Weight |
| Fluorspar | 10 |
| 75% $H_3PO_4$ | 20 |
| Alpha cristobalite (100 mesh) | 10 |
| Alpha-quartz (100 mesh) | 10 |
| Sodium hexametaphosphate | 25 |
| Bentonite clay (325 mesh) | 10 |
| Water | 15 |

EXAMPLE

Composition 3 was trowelled around the joint of the ascension pipe in a coke oven. It lasted for 4 campaigns whereas the material previously used, e.g. Bentonite water mortar, lasted for only 1 campaign before it had to be replaced.

The compositions of the invention are most beneficially used for caulking or grouting or sealing areas where the temperature is about 500° C. or higher. Thus, Sinter plant furnaces and other similar high temperature units can employ the caulk to good advantage.

Having thus described my invention, it is claimed as follows:

1. A high temperature refractory caulking composition useful for sealing coke oven ascension pipes, Sinter furnaces, and the like, comprising:

| Ingredients | % by Weight |
|---|---|
| Alpha cristobalite | 10-30 |
| Alpha-quartz | 10-50 |
| Glassy polyphosphate having a deformation temperature of at least 500° C. | 10-50 |
| Bentonite clay | 1-10 |
| Water | An amount sufficient to form the above ingredients into a workable plastic mass. |

2. The composition of claim 1 where the glassy polyphosphate is sodium hexametaphosphate.

3. A high temperature refractory caulking composition useful for sealing coke oven ascension pipes, Sinter furnaces, and the like, comprising:

| Ingredients | % by Weight |
| --- | --- |
| Fluorspar | 5 – 15 |
| 75% H₃PO₄ | 10 – 30 |
| Alpha cristobalite | 10 – 30 |
| Alpha-quartz | 10 – 50 |
| Glassy polyphosphate having a deformation temperature of at least 500° C. | 10 – 50 |
| Bentonite clay | 1 – 10 |
| Water | An amount sufficient to form the above ingredients into a workable plastic mass. |

4. The composition of claim 3 where the glassy polyphosphate is sodium hexametophosphate.

5. A high temperature refractory caulking composition useful for sealing coke oven ascension pipes, Sinter furnaces, and the like, comprising:

| Ingredients | % by Weight |
| --- | --- |
| Alpha cristobalite (100 mesh) | 24.6 |
| Alpha-quartz (100 mesh) | 34.1 |
| Sodium hexametaphosphate | 24.6 |
| Bentonite clay (325 mesh) | 2.5 |
| Water | 14.2 |

6. A high temperature refractory caulking composition useful for sealing coke oven ascension pipes, Sinter furnaces, and the like, comprising:

| Ingredients | % by Weight |
| --- | --- |
| Flurospar | 10 |
| 75% H₃PO₄ | 20 |
| Alpha cristobalite (100 mesh) | 10 |
| Alpha-quartz (100 mesh) | 10 |
| Sodium hexametaphosphate | 25 |
| Bentonite clay (325 mesh) | 10 |
| Water | 15 |

* * * * *